Figure 1:
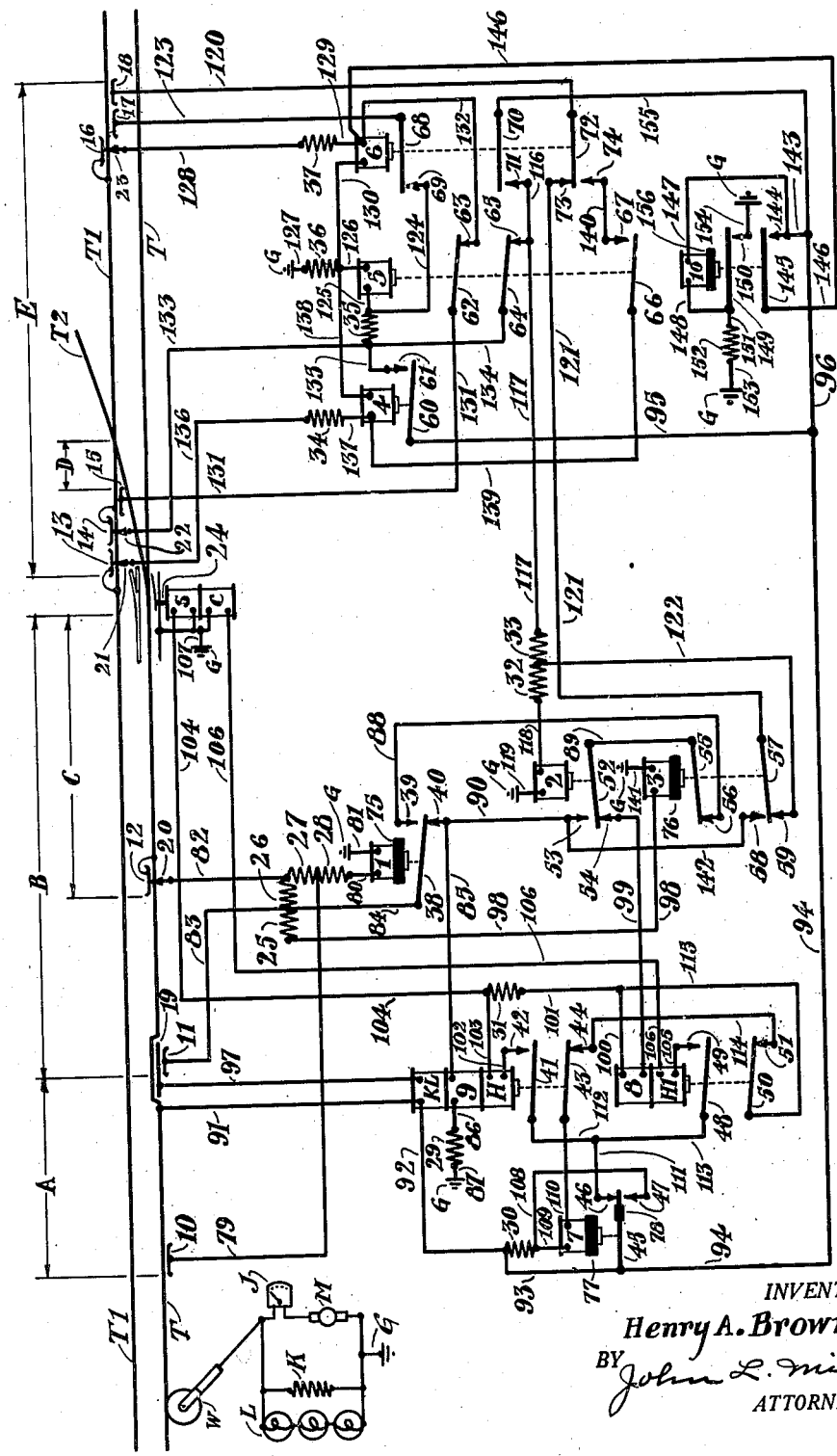

INVENTOR.
Henry A. Brown
BY John L. Milton
ATTORNEYS.

Patented June 7, 1949

2,472,063

UNITED STATES PATENT OFFICE 2,472,063

SAFETY CONTROL FOR TRACK SWITCHES

Henry A. Brown, Cleveland, Ohio

Application June 8, 1944, Serial No. 539,329

13 Claims. (Cl. 246—227)

My invention relates to improvements in the automatic operation of electric track-switches employed to direct railway cars either along the main track or onto a branch track at a turnout in a railway system.

The primary object of my invention is to provide a safety control for the automatic operation of track switches that will reduce to a minimum the accident hazard often encountered in the automatic operation of electric track-switches.

A further object of my invention is to provide a safety control that is particularly applicable to the automatic operation of track-switches at left-hand turnouts, in which the branch track for the cars moving in one direction along the main track intersects the other main track for the cars moving in the opposite direction.

Another object of my invention is to provide a control that will automatically operate the track switch for the main track when a car approaches the turnout at a speed greater than a predetermined amount.

Another object of my invention is to provide a control that will require a car either to be brought to an absolute stop in advance of the turnout or to approach the turnout at a speed less than a predetermined amount in order to automatically operate the track switch for the branch track.

Another object of my invention is to provide a control that will automatically restore the track switch for the main track after a car approaching the turnout has operated the track switch for the branch track, and a car moving on the other track enters a predetermined portion of its track in advance of the intersection of the branch track therewith.

Another object of my invention is to provide a control that will automatically operate the track switch for the main track when a car approaches the turnout after a car on the other track has entered a predetermined portion of its track in advance of the intersection of the branch track therewith, regardless of whether the car approaching the turnout performs the required operations to operate the track switch for the branch track.

Another object of my invention is to provide a control that will prevent an automatic restoration of the track switch for the main track when the car on the other track enters a predetermined portion of its track in advance of the intersection of the branch track therewith while a car is moving over the track switch and onto the branch track.

The advantages of these and other objects will become more apparent as the following description is read in connection with the accompanying drawing, in which the single figure is a schematic drawing showing the electrical connections of one embodiment of my safety control and the location of various trolley contact devices employed to operate the control.

The control shown in the accompanying drawing is one of the preferred embodiments of my invention, which employs trolley contact devices to control the operation of same. However, it is to be understood that the objects of my invention may be embodied in controls that are operated by devices other than trolley contactors, as, for instance, track circuits, track instruments, photo electric controls, or any of a plurality of well known devices that will effect the operation of relays when a car either enters or occupies a predetermined portion of track adjacent a turnout. It is also to be understood that although I have illustrated electromagnets for operating the track switch, other devices may be employed to operate the track switch without departing from the spirit of my invention, as, for instance, an electric motor or an electro-pneumatic switch machine. It is also to be understood that although I have shown but one electrical circuit to illustrate the operation of my invention, I am not to be limited to this specific embodiment other than by the appended claims, as the objects of my invention may be embodied in other electrical circuits without departing from the spirit of my invention.

To present clearly the operation of the embodiment of my invention illustrated in the figure, I have conveniently divided the description into five parts, namely:

"General," which presents the general relation of trolley contactors and their operative functions;

"Circuit changer," which presents the operation of relays 7, 8 and 9 employed to control directly the circuits connecting the electro-magnets S and C of the track switch;

"Safety control," which presents the operation of relays 1, 2 and 3 employed to provide the "enforced stop" feature; automatic restoration of the track switch for the main track by a car approaching the intersection on the opposite track; and the "locking" feature, which prevents an automatic operation of the track switch for the branch track when a car approaches the turnout after a car on the other track has entered a predetermined portion of its track in advance of the intersection of the branch track therewith, regardless of whether the car approaching the turnout performs the required operations to operate the track switch for the branch track;

"Counting device," which presents the operation of relays 4, 5 and 6 employed to control the operation of relay 2 as long as a predetermined portion of the track in advance of the intersection of the branch track therewith is occupied by a vehicle; and "Power failure relay," which presents the operation and function of relay 10.

Part 1.—General

In the figure, the solid lines T and T1 represent the overhead trolley-wires of a main line of an electric railway, and the solid line T—2 represents the overhead trolley wire of a turnout for the main line employing the trolley wire T. As is well known to those skilled in the art, the trolley wires are connected to a positive feeder, and the track rails connected to a negative feeder and the earth. The propulsion current for the car operating on the track rails is received from the trolley wire via a current collector W, and the return connection to the track rails is completed through the wheels of the car engaging the track rails.

A conventional track switch is installed in the track rails at the turn-out, for directing the car from the main track onto the branch track of the turn-out. In the figure, the light lines to either side of the trolley wires T and T1 represent the track rails of the main and branch tracks at the turn-out, and the electro-magnets S and C are mechanically connected to the movable tongue of the track switch via a connecting link 24. Energization of the electro-magnet S operates the track switch for the main track and energization of electro-magnet C operates the track switch for the branch track.

A switch-operating contactor is installed on the trolley wire T, and the contactor is usually placed on the wire so that the distance B from the entering end of the switch tongue to the entering end of the contact strip 11 is six feet greater than the horizontal distance from the forward bumper to the current collector W on the longest car.

The switch-operating contactor consists of a rigid contact member 19 and a flexible contact member 11, and is constructed so that the current collector disengages the trolley wire T and engages the contact members 19 and 11 in passing the same. The construction of such a contactor is well known to those skilled in the art, and may be of the type shown in United States Patent No. 2,076,101, issued to S. S. Stolp et al. on April 6, 1937.

A trolley contactor having a flexible strip 10 is positioned on the trolley wire T in advance of the switch-operating contactor, and this contactor is arranged so that the strip 10 is electrically connected to the trolley wire T via the current collector W when the collector passes the strip 10. The contact strip is positioned on the trolley wire T so that the distance A from the entering end of the contact strip 11 to the entering end of the strip 10 is less than the horizontal distance from the forward bumper to the current collector W on the shortest car. An average distance of 20 feet for the distance A will enable the cars to come to a stop or operate at a considerably reduced speed while the collector thereof is operating between the contact strips 10 and 11.

A trolley contactor having a movable member 12 is positioned on the trolley wire T between the switch operating contactor and the turnout. The movable member 12 is electrically connected to the trolley wire T and normally electrically engages a stationary contact 20. The movable member 12 is positioned on the wire so that the distance C is equal to the horizontal distance from the front axle to the current collector on the longest car. In other words, the contact member 12 is positioned so that the coil relay 3 is de-energized and its contact arm 57 out of engagement with contact 58 before the front wheels of the car move beyond the tongue of the track switch. This arrangement permits a car on the other track to restore the track switch for the main track while the collector W is moving between the strip 11 and member 12, and prevents this restoration operation after the contact arm 57 of relay 3 disengages its contact 58.

Six trolley contactors are mounted on the trolley wire T1. The contactors having contact members 13, 14 and 16 are similar to the contactor having the contact member 12, and the contactors having the contact strips 15, 17 and 18 are similar to the contactor having the contact strip 10.

Preferably, the contact members 13 and 14, and the contact strip 15 are mounted end to end as illustrated, and the distance D must not be less than the longest horizontal distance from the current collector W to the rear end of the car.

Likewise, the contact member 16, and the contact strips 17 and 18 are mounted end to end as illustrated, and the distance E for the three-car counting system consisting of relays 4, 5 and 6 must not exceed three times the length of the shortest car. The distance E can be increased or decreased by arranging the counting system to register the number of shortest cars that can occupy the distance.

Part 2.—Circuit Changer

The circuit changer consists of relays 7, 8 and 9, and these are employed to control the energization of the electromagnets S and C.

Relay 7 has a normally-energized high-resistance operating-coil and a copper slug or sleeve 77 for retarding the release of its contact arm 45 following the de-energization of its operating coil. In this respect it is to be understood that the copper slug 77 is constructed and arranged on the core of the relay 7 so that the raising of the contact arm 45 is not materially affected. Such a relay is well known to those skilled in the art as a slow-release quick-pickup relay.

Contact arm 45 of relay 7 normally engages contact 46, and is provided with a magnetic blow-out for interrupting the relatively heavy current broken between the arm 45 and contact 46 as symbolically represented by element 78. When the coil of relay 7 is de-energized, the contact arm 45 engages contact 47.

Relay 8 has a normally-de-energized, high-resistance operating-coil, and a relatively low-resistance holding-coil H1 that is arranged to be placed in series with the current flowing to the electromagnet C. Normally, contact arm 48 of relay 8 disengages contact 49 and contact arm 50 engages contact 51.

Relay 9 has a low-resistance operating coil KL consisting of a few turns of number 6 magnet coil wire, and this coil is adapted to be placed in series with the current flowing to the propulsion motors of the car, when the collector W engages the contact member 19.

Relay 9 also has a low-resistance holding coil H that is arranged to be placed in series with the current flowing to the electromagnet S.

Also, relay 9 has a normally-de-energized, high-resistance coil that is energized when the collector W engages the contact member 11 before the armature 38 of relay 1 disengages contact 40; or when a collector W engages contact member 18 with armature 72 of relay 6 engaging contact 73 and armature 57 of relay 3 engaging contact 58; or when the collector W engages the contact member 11 after the armature 38 of relay 1 engages contact 39 with armature 52 of relay 2 engaging contact 53. The operation of the high-resistance coil of relay 9, and the circuits involved in the aforesaid operations will be described more completely under the description of relays 1, 2, 3 and 4, 5, 6.

Normally, contact arm 41 of relay 9 disengages contact 42, and contact arm 43 engages contact 44.

Resistances 30 and 31 are relatively high and are of such value that the currents flowing through them will not energize the electromagnet S sufficiently to provide an operation of the track switch.

As hereinbefore mentioned, the operating coil of relay 7 is normally energized in a retaining circuit extending from the positive trolley-wire T, through wires 91 and 92, resistance 30, wire 109, coil of relay 7, wire 110, contact arm 43 of relay 9, contact 44, wire 114, contact 51 of relay 8, contact arm 50, wires 115 and 101, resistance 31, wire 104, electromagnet S, wire 107 to the negative or ground return G.

From the foregoing it will be apparent that an operation of either relay 8 or 9 will open the circuit of the operating coil of relay 7, via the disengagement of 50—51 or 43—44, and de-energize the same. By reason of the retarding device 77 of relay 7, the contact arm 45 will disengage contact 46 after a short period of time and engage contact 47. Therefore, when the circuit of the operating coil of relay 7 is again completed by the engagement of 43—44 and 50—51, a pickup circuit for relay 7 is completed from the positive trolley T through wires 91—92 and 93, contact arm 45 of relay 7, contact 47, wires 108 and 109, operating coil of relay 7, wire 110, contact arm 43, contact 44, wire 114, contact 51, contact arm 50, wires 115 and 101, resistance 31, wire 104, electromagnet S, wire 107 to the negative return G.

Since relay 7 is a relatively quick pick-up relay, contact arm 45 will immediately disengage contact 47 and engage contact 46, whereupon the aforesaid retaining circuit for the operating coil of relay 7 via resistance 30 will become effective.

Relay 9 has a very low-resistance operating-coil KL which is selectively connected in series with the propulsion motors M of the car, when the collector W engages the contact member 19. This selective energization of the coil KL is ordinarily referred to as "power-on" and "power-off" operation. Thus, when the car is operated with "power-on" the propulsion motors M as the collector W engages the contact member 19, the coil KL is energized sufficiently to raise armatures 41 and 43. Likewise, when the car is operated with "power-off" the propulsion motors M, as the collector W engages the contact member 19, the coil KL is not energized sufficiently to raise armatures 41 and 43, even though the currents of the car lights L and heaters K flow through the coil KL at such time. The "power-on" and "power-off" operation of the propulsion motors M is controlled by the motor controller J carried by the car.

Accordingly, when the car is operated with "power-on" the car motors and the collector W is in engagement with the contact member 19, the coil KL is energized in a circuit extending from the trolley wire T, through wire 91, coil KL, wire 97, contact member 19, current collector W, motor controller J, propulsion motors M to the negative return G. Likewise, since the lights L and heaters K are electrically connected in multiple with the controller J and propulsion motors M, the circuit of the coil KL will also extend to the negative return G through each of these branches.

The aforesaid energization of coil KL will raise armature 43 out of engagement with contact 44 and armature 41 into engagement with contact 42, whereupon a circuit is completed for energizing the track switch electromagnet S and the low-resistance holding-coil H of relay 9. The latter circuit is completed from the trolley wire T through wires 91, 92 and 93, armature 45 of relay 7, contact 46, wires 111 and 112, armature 41 of relay 9, contact 42, wire 102, holding coil H of relay 9, wires 103 and 104, electromagnet S, wire 107 to the negative return G.

It will be noted that the operation of relay 9 also disengaged armature 43 from contact 44, which opened the circuit of the operating coil of relay 7. Thus, as described hereinbefore, armature 45 of relay 7 will release after a short interval of time and disengage contact 46, whereupon the aforesaid circuit for energizing the electromagnet S and holding-coil H will be opened and the armatures 41 and 43 will restore to their normal positions. Accordingly, as soon as armature 43 of relay 9 restores into engagement with contact 44, the operating coil of relay 7 will be energized and the armature 45 will restore into engagement with contact 46, as described hereinbefore.

Obviously, the energization of electromagnet S will operate the track switch for the main-track, if the track switch was positioned for the turnout, or retain it operated for the main track, if the switch had been previously operated to this position.

It is to be particularly noted that as long as operating current flows to the electromagnet S via armature 41, wire 104 is held substantially at positive potential. Therefore, when the collector W engages the contact member 11, the high-resistance operating-coil of relay 8 will not be energized, as both of the electrical connections to the operating-coil will be at substantially the same potential.

However, when the collector W engages the contact member 19 with "power-off" the propulsion motors of the vehicle, relay 9 will not operate, thus permitting relay 8 to operate when the collector W subsequently engages the contact member 11, providing, however, that the speed of the vehicle has been reduced sufficiently to permit relay 1 to operate. The circuit providing the operation of relay 8 is completed from the trolley wire T, wire 91, coil KL, wire 97, contact member 19, collector W, contact member 11, wires 83 and 84, armature 38 of relay 1, contact 39, wire 88, contact 56 of relay 3, armature 55, wire 89, armature 52 of relay 2, contact 54, wire 99, through the high-resistance operating-coil of relay 8, wires 100 and 101, resistance 31, wire 104, electromagnet S, wire 107 to the negative return G.

Upon completing the aforesaid circuit, the high-resistance operating coil of relay 8 will be energized, and the armature 50 will disengage contact 51 and armature 48 engage contact 49.

The engagement of armature 48 and contact 49 will complete a circuit for energizing the track-switch electromagnet C and the low-resistance holding coil HI of relay 8. The latter circuit is completed from the trolley wire T, through wires 91, 92 and 93, armature 45 of relay 7, contact 46, wires 111 and 113, armature 48 of relay 8, contact 49, wire 105, holding coil HI, wire 106, electromagnet C, wire 107 to the negative return G.

It will be noted that the operation of relay 8 also disengaged armature 50 from contact 51, which opened the circuit of the operating coil of relay 7. Thus, as described hereinbefore, armature 45 of relay 7 will release after a short interval of time and disengage contact 46, whereupon the aforesaid circuit for energizing the electromagnet C and holding coil HI will be opened and the armatures 48 and 50 will restore to their normal positions. Accordingly, as soon as armature 50 of relay 8 restores into engagement with contact 51, the operating coil of relay 7 will be energized and the armature 45 will restore into engagement with contact 46, as described hereinbefore.

Obviously, the energization of electromagnet C will operate the track switch for the branch track, if the track-switch was positioned for the main track, or retain it operated for the branch track if the switch had been previously operated to this position.

It is important to note that the operation of relay 8, when the collector engaged the contact member 11, was dependent upon armature 38 of relay 1 engaging contact 39, armature 55 of relay 3 engaging contact 56, and armature 52 of relay 2 engaging contact 54. Accordingly, reference is made to part 3, which describes completely the operation and function of relays 1, 2 and 3.

*Part 3.—Safety control*

In the description under Part 2, it was observed that the energization of the electromagnet S was obtained, when the collector engaged the contact member 19 with "power-on" the vehicle motors, and that the selective energization of the electromagnet S by a vehicle approaching the track switch was not dependent upon the operation of relays 1, 2, 3 or 4, 5, 6. However, it was observed that the energization of the electromagnet C not only required the vehicle to operate with "power-off" the vehicle motors in passing the switch-operating contactor, but depended upon the operating condition of relays 1, 2 and 3, when the collector W engaged the contact member 11.

In the description under Part 1, it was pointed out that the collector W engaged the contact member 10 before engaging the contact member 11, as the vehicle approached the track switch.

Normally, a light current flows through the operating coil of relay 1, which current is insufficient to operate relay 1, but sufficient to retain the relay in operating condition.

The retaining circuit for relay 1 is completed from the trolley wire T through contact member 12, contact 20, wire 82, resistances 27 and 28, wire 80, through the operating coil of relay 1, wire 81 to the negative return G.

Thus, when the collector W engages the contact member 10, a pickup or retaining circuit is completed which passes a heavier current through the operating coil of relay 1 and places the relay in an operating condition, whereupon the aforesaid retaining circuit becomes effective to retain armature 38 engaged with contact 39.

The operating circuit for relay 1 is completed from the trolley wire T through the collector W, contact member 10, wire 79, resistance 28, wire 80, operating coil of relay 1, wire 81 to the negative return G.

Relay 1 is a retarded pickup, quick-release relay, thus, a predetermined period of time will elapse before the armature 38 disengages contact 40 and engages contact 39.

In this respect it is to be understood that relay 1 is a conventional re-settable timing-device, in which operation is started by a pickup or starting circuit, and maintained operating by a stick or retaining circuit, until the retaining circuit is opened. Thus, when the starting circuit of relay 1, via wire 79 and resistor 28, etc., is momentarily energized, the relay is placed in operation, whereupon the retaining circuit, via wire 82 and resistor 27 etc., becomes effective to retain the relay operating, until the retaining circuit is subsequently opened at contact member 12. Commercially, relay 1 is known as a slow-pickup, quick-release, relay. Therefore, the armature 38 does not disengage contact 40 and engage contact 39 until the retaining circuit has been continuously effective for a predetermined time after the energization of the pickup or starting circuit. Thus, as well understood in the art, the slow-pickup, quick-release feature is not associated with the operating coil, but with the armature 38 to delay the operation of the respective contacts. In practice this is ordinarily accomplished by connecting the timing device directly to the armature 38, and driving the armature 38 through a spring, which is placed in operating tension when the pickup circuit of the operating coil is completed, and retained in operating tension by the retaining circuit of the operating coil, until it is subsequently momentarily opened.

The relay 1 employed in the figure, has an air-dash, timing-device mechanically connected to the contact arm 38. A spring mechanically connects the contact arm 38 and the magnetically operated armature of the relay. Normally, the high resistance retaining circuit does not sufficiently energize the operating coil to operate the magnetically operated armature of the relay. However, when the pickup circuit is energized, the magnetically operated armature is operated, and the retaining circuit becomes effective at once to retain the magnetically operated armature in operating condition. Thus, the spring is biased, and the tension thereof operates the contact arm 38 against the retarding action of the air-dash timing-device connected thereto. After a predetermined time, armature 38 disengages contact 40 and engages contact 39; remaining in this condition until the retaining circuit is momentarily de-energized, whereupon the magnetically operated armature and contact arm restore to their normal positions.

As hereinbefore mentioned, relay 3 is also a retarded-pickup, quick-release relay, and it therefore is to be understood that the construction and operation of the contact arms 55 and 57 is the same as that specifically described above for the contact arm 38 of relay 1.

As mentioned hereinbefore, the time period of relay 1 is sufficient either to compel the vehicle to be brought to a stop before passing the switch-operating contactor or to require its operating speed to be reduced to a safe operating condition before receiving an operation of the track switch for the branch track.

Thus, a vehicle operator observing this condition, when operating between the contact member 10 and the switch-operating contactor, will reduce the speed of the vehicle and permit a sufficient amount of time to elapse before passing the switch operating contactor so as to be permitted to operate selectively the track switch for the branch track.

Accordingly, if the vehicle operator observes the aforesaid condition, and desires to operate the track switch for the branch track, the vehicle is operated with "power-off" the vehicle motors in passing the switch operating contactor, and the track switch will operate for the branch track as described in part 2, providing however, relays 2 and 3 are in their normal positions, when the collector W engages the contact member 11.

Thus, when the current collector engages the contact member 11, a circuit is closed either through contact 39 or 40, depending upon the operating condition of armature 38 of relay 1.

It will also be observed that, when the collector engages the contact member 11, a circuit is completed for operating relay 3, the circuit being completed from the trolley wire T through wire 91, coil KL, wire 97, contact member 19, collector W, contact member 11, wire 83, resistance 25, wire 88, operating coil of relay 3, wire 141 to the negative return G.

The aforesaid energization of the operating coil of relay 3, raises armature 55 out of engagement with contact 56 and armature 57 out of engagement with contact 59 and into engagement with contact 58.

However, as mentioned in Part 1, relay 3 is a retarded-pickup, quick-release relay having a time period sufficient to assure operation of relay 8 before armature 55 disengages contact 56. Therefore, the aforesaid operation of armatures 55 and 57 will be delayed for a short period of time after the energization of the operating coil of relay 3.

Normally a light current flows through the operating coil of relay 3, which current is insufficient to operate relay 3 but sufficient to retain the relay in operating condition.

The aforesaid retaining circuit for relay 3 is completed from the trolley wire T through contact member 12, contact 20, wire 82, resistance 26 and 25, wire 98, operating coil of relay 3, wire 141 to the negative return G.

It is to be noted that relay 2 also has a light current flowing through its operating coil which is insufficient to operate it but sufficient to retain it in operating condition.

The retaining circuit for relay 2 is completed from the trolley wire T—1 through contact member 14, contact 22, wire 133, wire 134, armature 64, contact 65, wire 117, resistances 33 and 32, wire 118, operating coil of relay 2, wire 119 to the negative return G.

The operating circuit for relay 2 is completed from the trolley wire T1 through the current collector W, contact member 18, wire 120, armature 72, contact 73, wire 121, armature 57, contact 59, wire 122, resistance 32, wire 118, operating coil of relay 2, wire 119 to the negative return G.

Thus, when a current collector W engages contact member 18 before a collector engages the contact member 11, relay 2 is operated, and armature 52 is raised out of engagement with contact 54 and into engagement with contact 53, thus disconnecting the operating circuit of relay 8 and connecting the operating circuit for the high resistance coil of relay 9. Therefore, when a collector W engages the contact member 11, after a collector has engaged the contact member 18, relay 9 is operated to align the track switch for the main track, regardless of whether the vehicle passing the switch operating contactor has moved slowly between the contact members 10 and 11 and has "power-on" or "power off" the vehicle motors when the collector thereof engages the contact members 19 and 11.

As mentioned hereinbefore, the collector W in engaging the contact member 11 completes a circuit either through contact 40 of relay 1 to operate relay 9 for aligning the track switch for the main track, or through contact 39 to operate relay 8 to selectively align the switch for the branch track providing the vehicle is operating "power-off" the propulsion motors at the time the collector engages the contact member 11. Likewise, substantially simultaneously with the aforesaid operation of relays 8 or 9 from the contact member 11, relay 3 is operated, and armature 57 is brought into engagement with contact 58.

Therefore, if a collector W engages the contact member 18, after a collector has engaged the contact member 11 and before the latter collector engages contact member 12, a circuit is completed from the contact member 18 for operating relay 9 to align the track switch for the main track. The latter circuit being completed from the trolley wire T—1 through the collector W, contact member 18, wire 120, armature 72 of relay 6, contact 73, wire 121, armature 57 of relay 3, contact 58, wires 142, 90 and 85, high resistance operating coil of relay 9, wire 86, resistance 29, wire 87 to the negative return G. Thus, a vehicle operating from the trolley wire T1 entering a fouling or danger position before the vehicle operating from the trolley wire T enters the track switch, will align the track switch for the main track and thus avoid a collision.

If, however, the vehicle operating from the trolley wire T had entered the track switch before the collector engaged the contact member 18, relays 1 and 3 would have been restored to their normal positions, and the engagement of the collector W with the contact member 18 would merely operate the "lock-out" relay 2 via wires 121 and 122 as described completely hereinbefore. Thus, relay 2 remains operated as long as a vehicle occupies that portion of the track between the contact members 18 and 15.

Therefore, any following vehicle operating from the trolley wire T, will operate the track switch for the main track regardless of whether the vehicle operator observes the required time factor of relay 1 and regardless of whether the vehicle is operated with "power-on" or "power-off" the vehicle motors in passing the switch operating contactor, as described hereinbefore under the description of operation for relay 2.

As previously mentioned, the retaining circuits for relays 1 and 3 are completed from the trolley wire T through the contact member 12 and contact 20. Therefore, when a collector W engages the contact member 12, the member is moved out of engagement with contact 20 and the retaining circuits completed therethrough are opened and the relays 1 and 3 restore to their normal positions.

Obviously, therefore, if a vehicle approaches the track switch at such a speed wherein the collector W after engaging the contact member 10, engages the contact member 11 before the relay 1 operates, will complete a circuit via contact 40 for energizing the high resistance operating coil of relay 9, and thus align the switch for the straight track regardless of whether the vehicle is operated with "power-off" in passing the switch operating contactor.

Part 4.—Counting device

The counting device includes relays 4, 5 and 6, which relays are employed to control the operation of the lock-out relay 2 described in Part 3.

As mentioned at the outset of the specification, the counting device is employed to operate and retain operated relay 2 as long as a vehicle operating from the trolley wire T1 occupies that portion of the track designated by the character E.

Relay 6 is normally-operated and released to count-in the first vehicle; relay 5 is normally-released and operated to count-in the second vehicle; and relay 4 is normally-released and operated to count-in the third vehicle. Therefore, when 3 vehicles occupy the portion of track designated by the character E, relay 4 is released by the first vehicle leaving the aforesaid portion of track; relay 5 released by the second vehicle; and relay 6 restored to its normally-operated condition by the third vehicle leaving the portion of track.

Similarly, when two vehicles occupy the aforesaid portion of track, relay 5 is released by the first vehicle leaving and relay 6 restored to its normally-operated condition by the second vehicle leaving the portion of track.

Likewise, when only one vehicle occupies the portion of track E, relay 6 is restored to its normal operating condition, when the vehicle leaves the portion of track. Obviously, when following cars enter the portion of the track E as the preceding cars leave, the relays 4, 5 and 6 are operated in their proper sequence to register properly the number of cars occupying the portion of track E.

Accordingly, having pointed out the operating sequence of relays 4, 5 and 6, it is believed that the description of the operating and restoring circuits for each of the relays will enable those skilled in the art to determine the sequential operation under repeated operation.

As aforesaid, the operating coil of relay 6 is normally energized, thereby holding the armatures 68 and 70 out of engagement with their respective contacts 69 and 71, and armature 72 out of engagement with contact 74 and in engagement with contact 73, thereby permitting an operation of relay 2 when a collector W engages the contact member 18.

The circuit normally retaining the operating coil of relay 6 energized is completed from the trolley wire T—1 through the contact member 16, contact 23, wire 128, resistance 37, wire 129, operating coil of relay 6, wire 130, resistance 36, wire 127 to the negative return G. The current flowing in the latter mentioned circuit is relatively small, and is sufficient to retain the relay 6 operated, but insufficient to operate it.

Therefore, the circuit for normally restoring the relay 6 to an operating condition is completed from the trolley wire T1 through a current collector W, contact member 15, wire 131, armature 62 of relay 5, contact 63, wire 132, operating coil of relay 6, wire 130, resistance 36, wire 127 to the negative return G. Accordingly, when the latter circuit is completed by a collector engaging the contact member 15, relay 6 is restored to its normal operating condition and the retaining circuit via contact member 16 becomes effective to retain the relay in its operating condition. Obviously, therefore, when a collector W engages the contact member 16, the member disengages contact 23 and relay 6 releases.

However, before the collector engages contact member 16, the contact members 18 and 17 are engaged in sequence.

As described in Part 3, relay 2 is operated when a collector engages the contact member 18, provided, however, relay 6 is in its normally operated position. If, however, relay 6 is released, armature 72 engages contact 74 and a connection is made to contact 67 of relay 5. Obviously, therefore, relay 4 cannot be operated from contact member 18, until relay 5 operates.

Accordingly, when the collector engages contact member 17, no operation takes place unless relay 6 is released. Thus, if relay 6 is released, the collector W engaging the contact member 17 will complete a circuit for operating relay 5, the latter circuit being completed from the trolley wire T1 through the collector W, contact member 17, wire 123, armature 68 of relay 6, contact 69, wire 124, wire 125, operating coil of relay 5, wire 126, resistance 36, wire 127 to the negative return G.

Normally, a light current flows through the operating coil of relay 5 which is insufficient to operate it but sufficient to retain it operated. Therefore, when the aforesaid operating circuit for relay 5 is completed, the retaining circuit for relay 5 will become effective. The retaining circuit for relay 5 is completed from the trolley wire T1 through the contact member 14, contact 22, wire 133, resistance 35, wire 125, coil of relay 5, wire 126, resistance 36, wire 127 to the negative return G.

Obviously, therefore, when a collector W engages the contact member 14, the member will disengage contact 22 and relay 5 will restore to normal. However, if relay 4 is operated, armature 60 will engage contact 61, and place a direct connection from wire 133 to the trolley T, thus preventing a restoration of relay 5, when a collector engages the contact member 14, as long as relay 4 is operated. The aforesaid direct connection to the trolley wire T is completed from wire 133 through wire 135 to contact 61 of relay 4, through armature 60, wires 95, 94, 93, 92 and 91 to the trolley wire T, which wire is the same potential as the trolley wire T1.

Therefore, when relay 6 is released and relay 5 operated, relay 4 will operate, when a collector W engages the control member 18.

The operating circuit for relay 4 is completed from the trolley wire T1 through the current collector W, contact member 18, wire 120, armature 72 of relay 6, contact 74, wire 140, contact 67 of relay 5, armature 66, wire 139, operating coil of relay 4, wire 138, resistance 36, wire 127, to the negative return G.

Normally, a light current flows through the operating coil of relay 4 which is insufficient to operate it but sufficient to retain it in an operating condition. Therefore, when the aforesaid operating circuit for relay 4 is completed, the latter mentioned retaining circuit will become effective to retain relay 4 operated.

The retaining circuit for relay 4 is completed from the trolley wire T1, contact member 13, contact 21, wire 136, resistance 34, wire 137, operating coil of relay 4, wire 138, resistance 36, wire 127 to the negative return G. Obviously, therefore, when a collector engages the contact member 13, the member will disengage contact 21, and relay 4 will release. Releasing relay 4 disengages armature 60 and contact 61, thereby permitting relay 5 to release when a collector engages the contact member 14. Releasing relay 5 engages armature 62 and contact 63, thereby permitting relay 6 to restore to its operating condition when a collector engages the contact member 15.

As described hereinbefore, the retaining circuit for relay 2 is completed through contact 22 and contact member 14. Therefore, when a collector engages contact member 15 and restores relay 6 to normal, armature 70 of relay 6 will disengage contact 71, and thus permit relay 2 to release, when the collector subsequently engages the contact member 14.

In this respect, it is to be noted that the engagement of armature 70 of relay 6 and contact 71 connects wire 117 directly to the trolley wire T, thus preventing relay 2 from releasing until the relay 6 is restored to its normal operating condition. The circuit connecting wire 117 to the trolley wire T, which is the same potential as trolley wire T1, is completed from wire 117, through wire 116, contact 71, armature 70, wires 155, 96, 94, 93, 92 and 91 to the trolley wire T.

*Part 5.—Power failure relay*

Ofttimes power is temporarily removed from the trolley wires T and T1, and since the relay 6 is normally-operated, a relay 10 is incorporated to restore relay 6 to its operated condition in the event power is temporarily removed from the trolley wires.

However, in present day operation of electric street railways, power so infrequently leaves the trolley wires that relay 10 may not be necessary. Therefore, the use of relay 10 is entirely optional, depending upon operating requirements.

Relay 10 is normally operated, and armature 145 and 149 normally disengage their respective contacts 144 and 150. The circuit normally energizing the operating coil of relay 10 is completed from the trolley wire T through wires 91, 92, 93, 94, 96, 143, 147, operating coil of relay 10, wire 148, resistance 152, wire 153 to the negative return G.

Relay 10 is a retarded-pickup, quick-release relay. Therefore, when power leaves the trolley wires T and T1, relay 10 releases and armatures 145 and 149 engage their respective contacts 144 and 150. Accordingly, when power restores to the line, current flows from the trolley wire T through wires 91, 92, 93, 94, 96, 143, contact 144, armature 145, wire 146, coil of relay 6, wire 130, resistance 36, wire 127 to the negative return G. The aforesaid circuit restores relay 6 to its normally operated condition. After a short interval of time relay 6 will restore to its normally operated condition and armatures 145 and 149 will disengage their respective contacts. It is to be noted that armature 149 engaging contact 150 shunts resistance 152. Therefore, a heavier operating current flows through the coil of relay 10 until the armature 149 disengages contact 150.

Having thus described my invention, I claim:

1. In combination with a road system including a road forming an approach to a junction, having branch roads extending therefrom; directing means for traffic including means for determining the branch road that may be taken by a vehicle from the junction; control means selectively operable from the vehicle for controlling selectively the operation of the determining means; and means supervising the selective operation of the determining means, said supervisory means operating in response to a vehicle entering a fixed portion of the approach road and utilizing any period of time greater than a certain predetermined period of substantial duration in passing over another portion of the approach road in advance of the said fixed portion, to operate the determining means in accordance with the selective operation of the control means, and in response to a vehicle entering the said fixed portion and utilizing any period of time less than the aforesaid predetermined period in passing over the said another portion of the approach road, to operate the determining means independently of the control means to direct passage of the vehicle onto a predetermined one of the branch roads.

2. In combination with a road system including a road forming an approach to a junction having branch roads extending therefrom; directing means for traffic including means for determining the branch road that may be taken by a vehicle from the junction; control means selectively operable from the vehicle for controlling selectively the operation of the determining means; and means supervising the selective operation of the determining means, said supervisory means operating in response to a vehicle entering a fixed portion of the approach road at any instant beyond a predetermined period of substantial duration, to operate the determining means in accordance with the selective operation of the control means, and in response to a vehicle entering the said fixed portion of the approach road at any instant during the aforesaid predetermined period to operate the determining means independently of the control means to direct passage of the vehicle onto a predetermined one of the branch roads, the aforesaid predetermined period of time starting with the passage of the vehicle into another portion of the approach road in advance of the said fixed portion thereof, and terminating with the passage of the vehicle into the said fixed portion.

3. In combination with a road system including a road forming an approach to a junction having branch roads extending therefrom; directing means for traffic including means for determining the branch road that may be taken by a vehicle from the junction; control means selectively operable from the vehicle for controlling selectively the operation of the determining means; and means supervising the selective operation of the determining means, said supervisory means operating in response to a vehicle utilizing any period of time greater than a certain predetermined period of substantial duration in passing over a given portion of the approach road, to operate the determining means in accordance with the selective operation of the control means, and in response to a vehicle utilizing any period of time less than the aforesaid certain period in passing over the same portion of the approach road, to operate the determining means independently of the control means to direct passage of the vehicle onto a predetermined one of the said branch roads.

4. In combination with a road system including a road forming an approach to a junction having branch roads extending therefrom; directing means for traffic including means for determining the branch road that may be taken by a vehicle from the junction; control means selectively operable from the vehicle for controlling selectively the operation of the determining means; and speed responsive means supervising the selective operation of the determining means, said speed responsive means operating in response to a vehicle traveling at any speed less than a certain predetermined speed over a given portion of the approach road, to operate the determining means in accordance with the selective operation of the control means, and in response to a vehicle traveling at any speed greater than the aforesaid predetermined speed in passing over the same portion of the approach road, to operate the determining means independently of the control means to direct passage of the vehicle onto a predetermined one of the said branch roads.

5. In combination with a road system including a road forming an approach to a junction having branch roads extending therefrom; directing means for traffic including means for determining the branch road that may be taken by a vehicle from the junction; control means selectively operable from the vehicle for controlling selectively the operation of the determining means; and means supervising the selective operation of the determining means, said supervisory means operating in response to a vehicle entering a fixed portion of the approach road and utilizing any period of time greater than a certain predetermined period of substantial duration in passing over another portion of the approach road in advance of the said fixed portion, to operate the determining means in accordance with the selective operation of the control means, and in response to a vehicle entering the said fixed portion and utilizing any period of time less than the aforesaid predetermined period in passing over the said another portion of the approach road, to operate the determining means to direct the vehicle onto a predetermined branch road irrespective of the selective operation of the control means.

6. In combination with a road system including a road forming an approach to a junction having branch roads extending therefrom; directing means for traffic including means for determining the branch road that may be taken by a vehicle from the junction; control means selectively operable from the vehicle for controlling selectively the operation of the determining means; and means supervising the selective operation of the determining means, said supervisory means operating in response to a vehicle entering a fixed portion of the approach road at any instant beyond a predetermined period of time, to operate the determining means in accordance with the selective operation of the control means, and in response to a vehicle entering the said fixed portion of the approach road at any instant during the aforesaid predetermined period of time, to operate the determining means to direct the vehicle onto a predetermined branch road irrespective of the selective operation of the control means, the aforesaid predetermined period of time starting with the passage of the vehicle into another portion of the approach road in advance of the said fixed portion thereof, and terminating with the passage of the vehicle into the said fixed portion.

7. In combination with a road system including a road forming an approach to a junction having main and turnout roads extending therefrom; directing means for traffic including means for determining the road that may be taken by a vehicle from the junction; control means selectively operable from the vehicle for controlling selectively the operation of the determining means; and means supervising the selective operation of the determining means, said supervisory means operating in response to a vehicle utilizing a period of time greater than a certain predetermined period of substantial duration in passing over a given portion of the approach road, to operate the determining means in accordance with the selective operation of the control means, thereby to enable the operator of the vehicle to determine selectively the road that may be taken by the vehicle from the intersection, and in response to a vehicle utilizing any period of time less than the aforesaid certain period in passing over the same portion of the approach road, to operate the determining means to direct passage of the vehicle onto the main road irrespective of the selective operation of the control means.

8. In combination with a road system including a road forming an approach to a junction having main and turnout roads extending therefrom; directing means for traffic including means for determining the road that may be taken by a vehicle from the junction; control means operating selectively in response to the vehicle operating with "power-on" or "power-off" the vehicle motors to control selectively the operation of the determining means; means supervising the selective control of the determining means, said supervisory means operating in response to a vehicle utilizing a period of time greater than a certain predetermined period of substantial duration in passing over a given portion of the approach road, to permit selective control of the determining means by said control means, and in response to a vehicle utilizing a period of time less than the aforesaid certain period in passing over the same portion of the approach road, to compel operation of the determining means to direct passage of the vehicle onto the main road irrespective of the selective operation of the control means; and means for operating the determining means in accordance with the operation of the control and supervisory means.

9. In combination with a road system including a pair of main roads for vehicle movements in opposing directions, one of the main roads forming an approach to a junction having a main and turnout branch extending therefrom with the turnout branch intersecting the other of said main roads; directing means for traffic on the said one road including means for determining the branch that may be taken by a vehicle from the junction; control means selectively operable from a vehicle on the said one road, for operating selectively the said determining means; means operating in response to a vehicle entering a given portion of the said other road in advance of the intersection of the turnout therewith, for operating the determining means for the main branch; and means operating in response to a vehicle on the said one road for preventing an operation of the determining means by a vehicle on the other road, while the vehicle on the said one road is passing from the approach onto one or the other of said branches.

10. In combination with a road system including a pair of main roads for vehicle movements in opposing directions, one of the main roads forming an approach to a junction having a main and turnout branch extending therefrom with the turnout branch intersecting the other of said roads; directing means for traffic on the said one road including means for determining the branch that may be taken by a vehicle from the junction; control means selectively operable from a vehicle on the said one road, for operating selectively the said determining means; and means operating in response to a vehicle occupying a given portion of the other road in advance of the intersection of the turnout therewith, for conditioning the said control means to provide an operation of the determining means for the main branch irrespective of the selective operation thereof by a vehicle on the said one road.

11. In combination with a road system including a pair of main roads for vehicle movements in opposing directions, one of the main roads forming an approach to a junction having a main and turnout branch extending therefrom with the turnout branch intersecting the other of said main roads; directing means for traffic on the said one road including means for determining the branch that may be taken by a vehicle from the junction; control means selectively operable from a vehicle on the said one road, for operating selectively the said determining means; means operating in response to a vehicle entering a given portion of the other road in advance of the intersection of the turnout therewith for operating the determining means for the main branch; and means operating in response to a vehicle occupying the said given portion of the other road, for locking the said control means to prevent an operation of the determining means for the turnout branch.

12. In combination with a road system including a pair of main roads for vehicle movements in opposing directions, one of the main roads forming an approach to a junction having a main and turnout branch extending therefrom with the turnout branch intersecting the other of said main roads; directing means for traffic on the said one road including means for determining the branch that may be taken by a vehicle from the junction; control means selectively operable from a vehicle, and operating in response to a vehicle entering the approach to the junction and the selective operation of the operator of the vehicle for operating selectively the said determining means; and means operating jointly in response to a vehicle entering a given portion of the said other road in advance of the intersection of the turnout therewith and to a vehicle occupying a given portion of the said approach, for operating the determining means for the main branch.

13. In combination with a road system including a pair of main roads for vehicle movements in opposing directions, one of the main roads forming an approach to a junction having a main and turnout branch extending therefrom with the turnout branch intersecting the other of said main roads, directing means for traffic on the said one road including means for determining the branch that may be taken by a vehicle from the junction; control means selectively operable from a vehicle on the said one road for operating selectively the said determining means; and means operating jointly in response to a vehicle entering a given portion of the said other road in advance of the intersection of the turnout therewith, and to a vehicle occupying a given portion of the said one road in advance of the junction, for operating the determining means for the main branch.

HENRY A. BROWN.

REFERENCES CITED

The following references are of record in the file of this patent:

UNITED STATES PATENTS

| Number | Name | Date |
| --- | --- | --- |
| 773,324 | Hopewell | Oct. 25, 1904 |
| 978,053 | Olmsted | Dec. 6, 1910 |
| 1,187,872 | Thompson | June 20, 1916 |
| 1,763,011 | Shaver | June 10, 1930 |
| 1,865,193 | Kinghorn, Jr. | June 28, 1932 |
| 1,913,729 | Shaver | June 13, 1933 |
| 2,039,828 | Nicholson | May 5, 1936 |
| 2,092,021 | Richterkessing | Sept. 7, 1937 |

FOREIGN PATENTS

| Number | Country | Date |
| --- | --- | --- |
| 143,437 | Great Britain | Feb. 6, 1920 |
| 643,665 | France | Nov. 8, 1927 |